United States Patent [19]

Itagaki et al.

[11] Patent Number: 4,800,563
[45] Date of Patent: Jan. 24, 1989

[54] ERROR PROCESSING METHOD AND APPARATUS FOR INFORMATION PROCESSING SYSTEM

[75] Inventors: Teruo Itagaki; Teruo Noro, both of Hadano, Japan

[73] Assignee: Hitachi, Ltd., Tokyo, Japan

[21] Appl. No.: 893,179

[22] Filed: Aug. 5, 1986

[30] Foreign Application Priority Data

Aug. 24, 1985 [JP]  Japan ................... 60-186459

[51] Int. Cl.$^4$ ..................... G06F 11/14; G06F 11/16
[52] U.S. Cl. ......................................... 371/13; 371/10
[58] Field of Search .................... 371/13, 10, 38; 365/200; 364/200 MS File, 900 MS File

[56] References Cited

U.S. PATENT DOCUMENTS

| | | | |
|---|---|---|---|
| 3,222,653 | 12/1965 | Rice | 371/10 X |
| 4,051,460 | 9/1977 | Yamada | 371/10 X |
| 4,450,559 | 5/1984 | Bond | 371/10 |
| 4,475,194 | 10/1984 | LaVallee | 364/200 X |
| 4,558,446 | 12/1985 | Banba | 371/10 |
| 4,641,310 | 2/1987 | Martens | 371/13 X |
| 4,654,847 | 3/1987 | Dutton | 371/10 |

Primary Examiner—Jerry Smith
Assistant Examiner—Robert W. Beausoliel
Attorney, Agent, or Firm—Antonelli, Terry & Wands

[57] ABSTRACT

In an information processing apparatus, when error of an instruction read out from an instruction storage area is detected, a correct instruction is created and rewritten in the instruction storage area. The rewritten instruction is read out for undergoing again error detection. When error is again detected, decision is made as to whether the error is a fixed one. In the case of the fixed error, a correct instruction is stored in an alternative storage area, while a remedy pattern capable of evading that fixed error is written in the instruction storage area at an address location where the fixed error is detected. The correct instruction corresponding to the remedy pattern is read out from the alternative storage area.

15 Claims, 4 Drawing Sheets

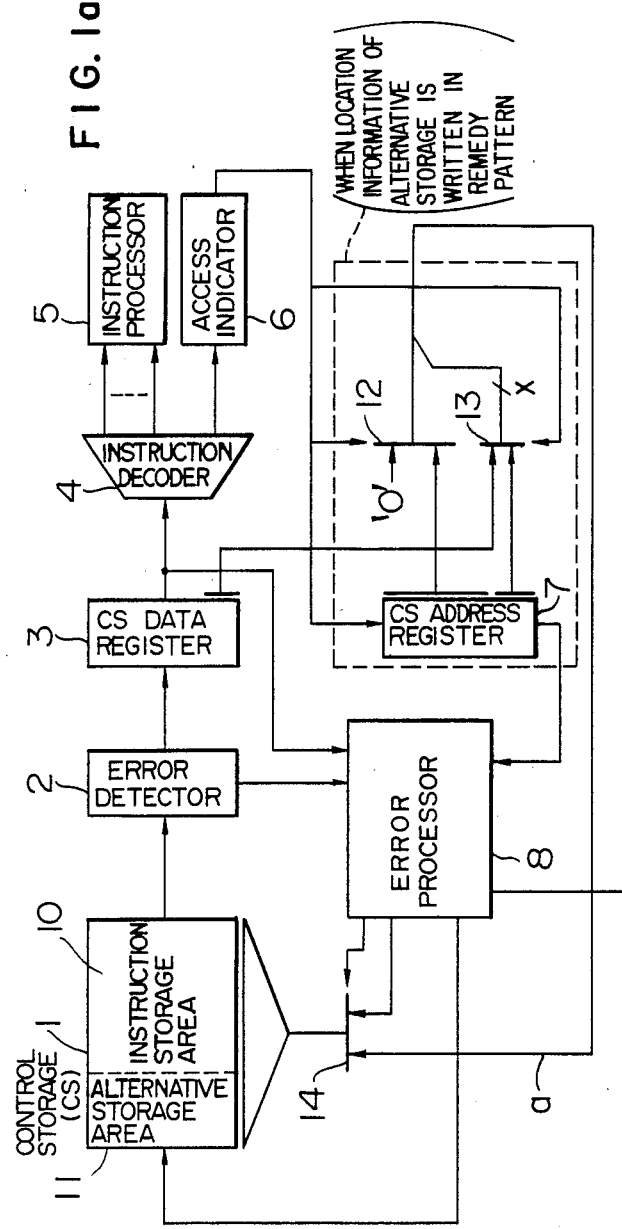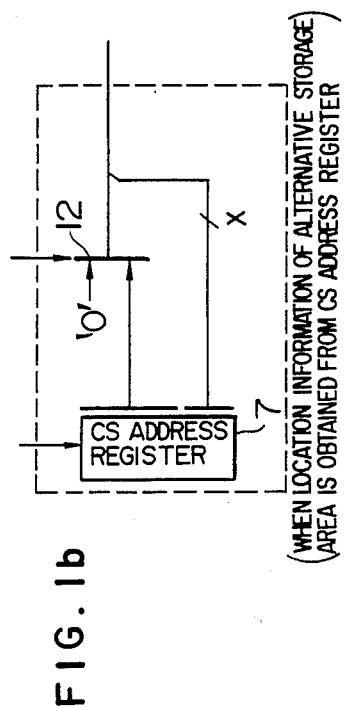

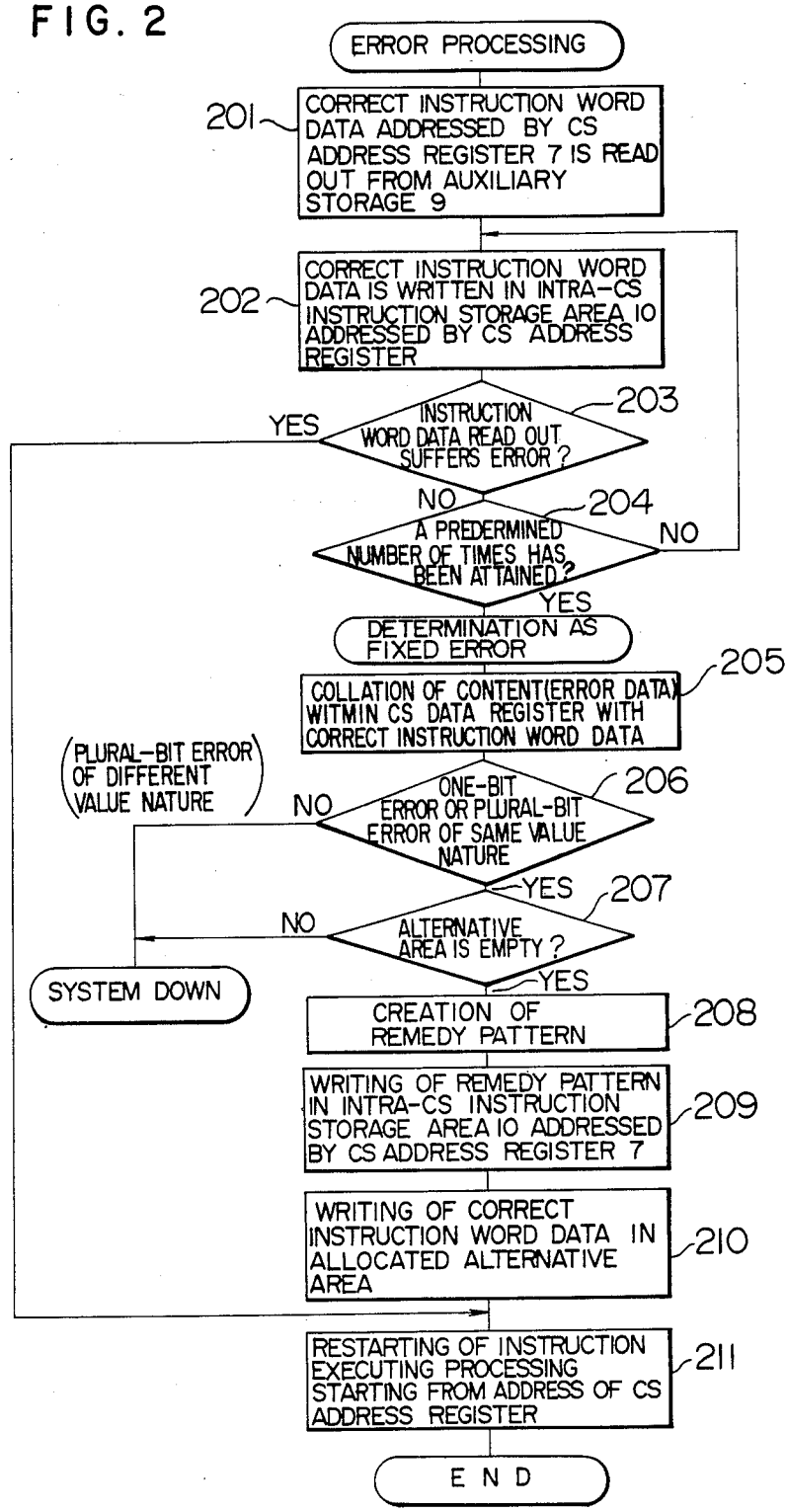

ERROR PROCESSING METHOD AND APPARATUS FOR INFORMATION PROCESSING SYSTEM

BACKGROUND OF THE INVENTION

The present invention generally relates to an error processing technique for use in an information or data processing system. More particularly, the invention concerns an error processing method and an apparatus which are advantageously suited for remedying fixed errors taking place in an instruction storage of an information processing system.

As methods of remedying a fixed error occurring in the instruction storage or memory in which a storage bit is destroyed in the state corresponding to a particular value "0" or "1", there have been heretofore known the following methods.

According to a first method, a value inverting bit is included in an instruction word for inverting the contents of the instruction word upon occurrence of a fixed error with the inverting bit set to "1". Upon decoding, the content of the instruction word is inverted again when the value inverting bit is "1" (reference may be made to, for example, JP-A-50-23951).

According to a second known method, when the fixed error is correctable, information for correcting the bit suffering the error is stored in an alternative storage, wherein the error bit is replaced by the correcting information upon execution of the error suffering instruction word (reference may be made to, for example, JP-A-56-22143).

According to a third known method, there are provided a plurality of error address registers and an error data register, wherein upon occurrence of uncorrectable fixed error, the address of the erroneous word and the corrected data are stored in the aforementioned registers. Upon execution of an instruction at the address of the erroneous word, the corrected information stored in the error data register is made available in place of the erroneous instruction word (reference may be made to, for example, JP-A-59-90149).

The first mentioned method is however disadvantageous in that the inverted word itself often suffers error again when error of the same value or nature covering at least two or more bits (i.e. error in which all the error bits assume the same value "1" or "0") is present in the instruction word. More specifically, assume that a correct data word consists of the two bits "01". When both bits are destroyed in the sense that they take the same value "0" or alternatively "1" (i.e. "00" or "11"), the word resulting from the inversion which should correctly be "01" again suffers error (i.e. "11" or "00"). Further, because of the need for one bit to serve as the value inverting bit, the memory utilization efficiency is correspondingly degraded which represents another disadvantage. The second mentioned method also has a drawback in that the hardware resource as required is of increased complexity because of the necessity of providing separately the alternative storage in addition to the instruction storage. Further, the objectives to be remedied are restricted to those errors which can be corrected by the error correcting circuit. When this method is intended to be applied to an uncorrectable error, such error which covers plural bits will also have to be dealt with. In that case, information of locations of plural bit data for the correction must be available, which means that the hardware resource as required is undesirably increased in complexity. The third known method requires a plurality of error address registers and error data register, as mentioned above, wherein the address of every instruction to be executed must be compared with the contents of the error address register without fail. As a consequence, the cost of the hardware resource required for the control of this end is increased, which also represents a disadvantage.

SUMMARY OF THE INVENTION

In the light of the technical state described above, it is an object of the present invention to provide an error processing method for an information processing system which is capable of remedying the type of fixed error having the same value or nature covering one or more bits of an instruction storage with a simple and inexpensive hardware structure. It is also an object of the invention to provide an error processing apparatus for carrying out the method.

In view of the above object, it is proposed according to an aspect of the present invention that a particular area of an instruction storage is reserved as an alternative storage area in which a correct instruction word which has undergone error correction is placed, and that a remedy pattern determined definitely so that all the bits thereof have the same value in the sense to evade the fixed error is placed in the instruction storage area at a location where the fixed error takes place, wherein access is made to the alternative storage area using the remedy pattern. According to the invention, it appears logically as if the corrected instruction was executed at the address of the erroneous instruction word.

In general, the fixed error of a storage element has a directivity (or sense) and error bits tend to assume the same value when the error covers plural bits, because the fixed error is more frequently ascribable to breakage of a bit wire, word wire or failure of an output buffer gate than the failure of a transistor itself which constitutes the heart of the elementary memory. The plural bit error of the same value or nature is difficult to remedy with the hitherto known method (inter alia the first mentioned method). In contrast, according to the invention, an error of this kind can be perfectly remedied by virtue of such arrangement in which the remedy pattern having bits all imparted with a same value in the sense to evade the fixed error is prepared and written at a location of the fixed error and in which the error-corrected instruction placed in the alternative storage area is executed by making access thereto using the remedy pattern.

Further, according to another aspect of the invention in which the remedy pattern is decoded as an instruction word for reading out again the corrected instruction word stored in the alternative storage area provided in the instruction storage and in which the execution of an instruction is performed as if the instruction was executed logically at the address of the fixed error, the latter can be remedied without involving interruption of the execution through additional simple logics without departing from the range of functions which the inherent instruction reading control logics have.

BRIEF DESCRIPTION OF THE DRAWINGS

FIGS. 1a and 1b are block diagrams showing a general arrangement of an error processing apparatus according to exemplary embodiments of the present invention;

FIG. 2 shows a flow chart for illustrating operation of an error processor (8) shown in FIG. 1;

DESCRIPTION OF THE PREFERRED EMBODIMENTS

Figure 3:
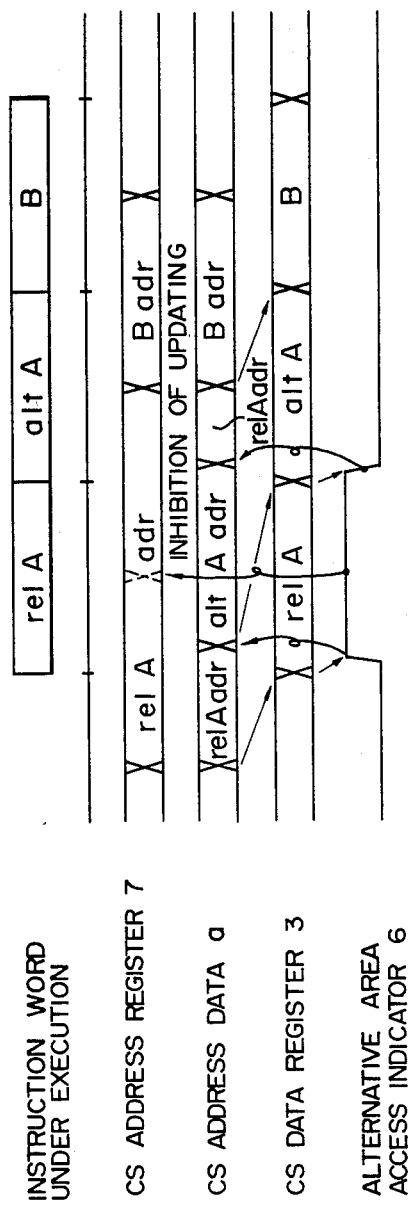
FIG. 3 shows a timing chart for illustrating the processing which following the fixed error remedy processing.

Now, the invention will be described in detail in conjunction with an exemplary embodiment thereof.

FIGS. 1a and 1b show in block diagrams a general arrangement of an information processing apparatus according to different embodiments of the present invention, which apparatus includes a control storage (CS) 1 for storing instruction words, an error detector 2 for checking whether or not the instruction word read out from the storage 1 suffers error, a CS data register 3 for holding the instruction word read out, an instruction decoder 4 for identifying discriminatively the types of the instruction words, an instruction processor 5 for executing the instruction as identified, an indicator 6 for indicating that access is being made to an alternative memory area set upon decoding of a remedy pattern by the instruction decoder 4, as described hereinafter, a CS address register 7 for holding the address of the instruction to be executed, an error processing unit (also referred to as an error processor) 8 activated by the output of the error detector 2 upon detection of error in the instruction word read out from the control storage 1 for executing the error remedy processing, an auxiliary storage 9 storing a map of the group of instruction words stored in the control storage 1, and selectors 12, 13 and 14. Further, a reference numeral 10 denotes an intra-CS instruction storage area provided within the control storage or CS 1 (hereinafter referred to as the intra-CS storage area), and a numeral 11 denotes an intra-CS alternative storage area where an alternative correct instruction word is stored upon occurrence of a fixed error in the intra-CS instruction storage area 10. A reference letter a designates CS address signal lines, x designates a number (an arbitrary integer) of bits determining the size of capacity of the intra-CS alternative storage area 11. Two broken-line blocks shown in FIGS. 1a and 1b indicate two alternative circuit configurations, i.e. one for the case in which the location information of the alternative storage area is derived from the CS address register 7 (FIG. 1b) and the other for the case in which the location information is written in the remedy word (FIG. 1a).

The instruction stored in the intra-CS instruction storage area 10 is read out when the address designated by the CS address register 7 is supplied to the control storage or CS 1 through the selectors 12, 13 and 4 in the state ready for executing the instruction. The instruction thus read out is checked by the error detector 2 for the presence or absence of error (e.g. parity check) and at the same time the instruction is placed in the CS data register 3. If the presence of an error is detected by the error detector 2, a corresponding message is given to the error processor 8, whereupon the error processing such as illustrated in the flow chart of FIG. 2 is activated. Referring to FIG. 2, correct instruction word data is first read out from the auxiliary storage 9 at a step 201 and rewritten in the intra-CS instruction storage area 10 at the error address where an error occurs (step 202). The rewritten instruction word is again read out to subsequently undergo the error check at a step 203. When an error is again detected, correct word data is read out from the auxiliary storage 9 and again rewritten in the intra-CS instruction storage area 10 at the error address at a step 204. This operation is repeated a predetermined number of times until the error disappears. Unless the error disappears even after the read-/write operation mentioned above has been repeated more than a predetermined number of times, the error is regarded as a fixed error due to the failure or destruction of the associated memory element of the control storage 1 of the like cause.

Upon determination of the presence of a fixed error, the error processor 8 compares or correlates the error data held by the CS data register 3 with correct instruction word data at a step 205. At a succeeding step 206, the result of the correlation is checked. When it is found that a plurality of bits suffer from an error of different value or nature (coexistence of error bits of values "0" and "1"), the system is shut down. On the other hand, when the error under consideration is a single-bit error or plural-bit error of the same value or nature (i.e. all the error bits assume the value "0" or alternatively "1"), it is established that the error can be remedied, and the error processing proceeds to a step 207.

At the step 207, it is checked whether the alternative storage area is empty and available. To this end, two approaches may be adopted. First, the location information of the intra-CS alternative storage area may be derived from x less significant bits of the CS address register 7 holding the address in which the fixed error originates. In that case, it is checked whether the corresponding address location within the intra-CS alternative storage area is empty or already occupied as the alternative storage location for another error. Second, the location information of x bits may be written in the remedy pattern. In that case, it is checked whether there is still available the empty location within the intra-CS alternative storage area 11 which is not yet occupied as the alternative location. In any case, it is checked whether the alternative storage location is empty and available. When the whole alternative area is occupied, the system is shut down. In contrast, when an empty storage location is available within the alternative storage area, a remedy pattern is generated at a step 208. More specifically, one pattern of which all the bits are imparted with the same bit value corresponding to that of the error bit (e.g. all of "0" or "1"), and which thus allows the error to be avoided is selected from those illustrated in FIG. 4, as will be described hereinafter. In the case where the location information is written in the remedy pattern, the address (x bits) of the available empty location determined at the step 207 is set in the remedy pattern as the location information (ALT No.). At a stpe 209, the remedy pattern as generated is written in the intra-CS instruction storage area 10 at the address where the associated fixed error has occurred, while at a step 210, the correct instruction word data read out from the auxiliary storage 9 is written in the empty location within the intra-CS alternative storage as determined at the step 207. Finally, at a step 211, the processing for executing the instruction is restarted from the address designated by the CS address register 7, i.e. the address where the fixed error has taken place and the remedy pattern has been written. The error processing then comes to an end.

Turning to FIG. 1a, the remedy pattern is read out from the address of the intra-CS instruction storage area 10 of the control storage 1 where the fixed error has occurred and then undergoes the error check by the error detector 2. At this time, no error can be detected, and the remedy pattern is placed in the CS data register 3 as with the case of the normal instruction word. Subsequently, upon decoding of the remedy pattern in concern by the instruction decoder 4, the instruction processor 5 is not activated, but the indicator 6 indicates that access is being made to the alternative storage area. When this indicator 6 is set, the CS address register 7 is inhibited from being updated in the next cycle. Further, the selector 12 inhibits the output of the address information from the CS address register 7, and a constant selected arbitrarily is outputted as the more significant bits of the CS address signal lines a. This constant designates the more significant bits of the storage location within the intra-CS alternative storage area. In the cases of the system illustrated in FIGS. 1a and 1b, this constant is selected to be "0". When the information of the storage location within the intra-CS alternative storage area 11 is obtained from the CS address register 7, the less significant bits of the CS address signal lines a are constituted by the corresponding bits of the CS address register 7 and outputted. In the case where the location information is written in the remedy pattern, the outputting of the corresponding bits of the CS address register 7 is inhibited by the selector 13, and the bits corresponding to ALT No. of the remedy pattern placed in the CS data register 3 are outputted. By virtue of the CS address signal lines a prepared in this way, the correct instruction word data located within the intra-CS alternative storage area 11 is read out to be executed in the next cycle. Since the CS address register 7 holds the instruction address of the location of the fixed error at that time, it appears logically that the correct instruction is executed at the address location of the fixed error. In this connection, it should be mentioned that no problem will arise when the address of the instruction to be next executed is prepared from the current contents of the CS address register 7 (e.g. when the more significant bits of a branch address for a conditional branching instruction is derived from the current CS address).

FIG. 3 illustrates in a timing chart the execution for the instruction at the address (rel A adr) of the fixed error in succession to the fixed error remedy processing. In the figure, "rel A" represents the remedy pattern, "alt A" represents the correct instruction transferred to the intra-CS alternative storage area 11, "rel A adr" represents the address where error has occurred, and "alt A adr" represents the address of the correct instruction within the intra-CS alternative storage area 11.

At first, the remedy pattern "rel A" is read into the CS data register 3 with "rel A adr" and decoded by the instruction decoder 4 with the alternative storage area access indicator 6 being set "ON". At the same time, "alt A adr" makes appearance in the CS address signal lines a through the selector 12 when the location information of the alternative storage area is obtained from the CS address register 7 or through the selectors 12 and 13 when the location information of the alternative storage area is written in the remedy pattern. In the next instruction cycle, the correct instruction "alt A" located in the intra-CS alternative storage area 11 is read into the CS data register 3. Since the updating of the CS address register 7 is inhibited by the alternative storage area access indicator 6 which is set "ON" at that time, it appears as if the correct instruction "alt A" were executed at the original address "rel A adr" when the fixed error has occurred, because of "rel A adr" being held. When the correct instruction "alt A" is read into the CS data register 3 and decoded by the instruction decoder, the indicator 6 indicating that access is being made to the alternative storage area is reset to the "OFF" state.

Figure 4:
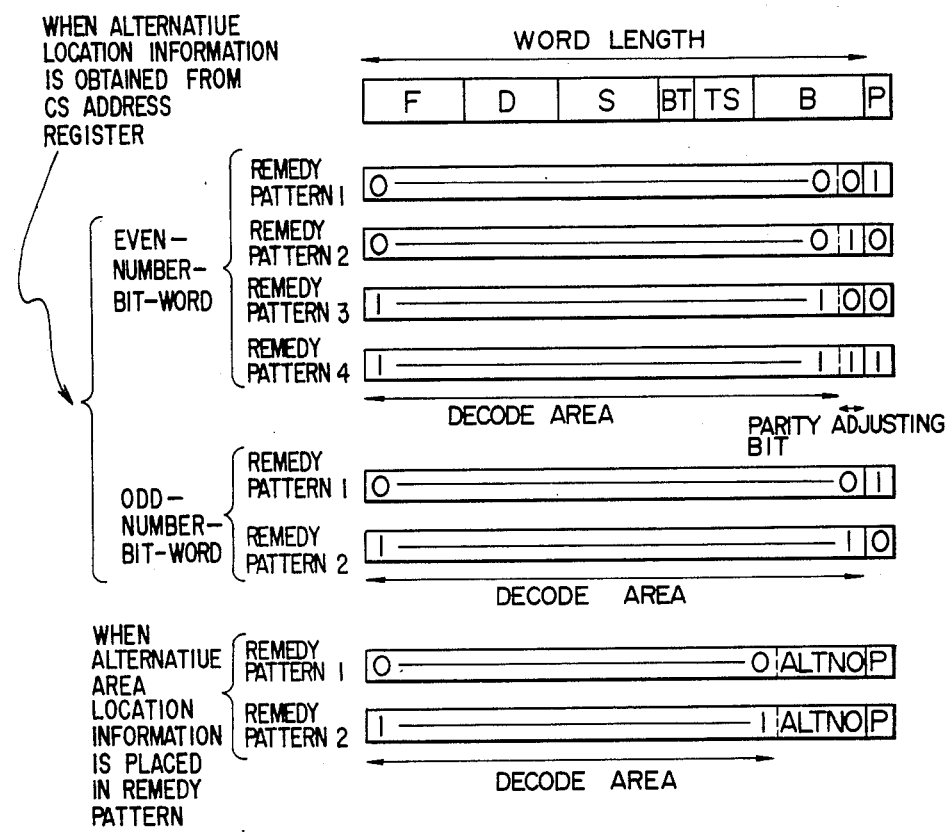
FIG. 4 is a view illustrating formats of fixed error remedy patterns which can be employed in carrying out the invention.

FIG. 4 illustrates formats for the case in which the location information of the intra-CS alternative storage area 11 is obtained from the CS address register 7 and the case where the location information is contained in the remedy pattern, respectively. Parenthetically, the odd parity is adopted. When the location information is obtained from the CS address register 7, the decoding area is available to a maximum which in turn means that restriction imposed on the instruction architecture can be reduced. However, occurrence of error in duplicate at the same address for the alternative location can not be dealt with. On the other hand, in the case where the location information is contained in the remedy pattern, the area available for the decoding is restricted. Consequently, the restriction imposed on the instruction architecture is correspondingly increased. However, the fixed error can be remedied to an extent allowed by the size of the alternative storage area. When a fixed error takes place in the area of the location information (ALT No) of the remedy pattern, the location information which can avoid the error is assigned with preference. By way of example, when the least significant bit of "ALT No" is destroyed in the state "1", the error can be avoided by an odd number of location information. Accordingly, the odd-numbered addresses (1, 3, 5, 7, . . . ) of the intra-CS alternative storage area are assigned with preference.

Selection of the remedy pattern may be carried out in the manner mentioned below.

Assuming that an "F" field of an instruction word is wholly destroyed in the state "1", error can be avoided by selecting the remedy pattern such that the "F" field is all of "1"s. Accordingly, in the case where the alternative area location information is obtained from the CS address register 7, the pattern 3 or 4 is selected when the instruction word includes an even number of bits, while the pattern 2 is selected when the instruction word is composed of an odd number of bits. In the case where the alternative area location information is contained in the remedy pattern, the remedy pattern 2 may be selected.

As will now be appreciated from the foregoing description, according to the illustrative embodiment of the invention, the fixed error of the same value or nature covering one or more bits in the instruction storage can be remedied by an additional circuit of a simple configuration by virtue of the feature that the remedy pattern is used as the instruction for making access to the alternative storage area. In most cases, the fixed error due to the structural failure of the memory element originates in the breakage of a bit wire, word wire or destruction of an output buffer gate rather than the destruction of the transistor itself which constitutes the memory element, and thus the error tends to be of the same value or nature over a plurality of bits. The error processing according to the embodiment of the invention described above is suited for dealing with this kind of error.

As will be understood from the foregoing description, the present invention makes it possible to remedy a fixed error of the same value or nature covering one or more bits in the instruction storage with an additional circuit of a simple configuration, whereby the reliability of the information processing system can be enhanced significantly without involving high expensiveness, to a great advantage.

We claim:

1. An error processing method for generating a correct instruction word in dependence on an error level of an instruction word to be executed, in an information processing system including an instruction storage which is divided into a regular storage area for storing instruction words and an auxiliary storage area for storing correct instruction words, comprising:
    a first step of setting a particular pattern in a storage location of said regular storage area in which an instruction word having a fixed error is detected;
    a second step of storing a correct instruction word in said auxiliary storage area at a storage location indicated by the storage location of said regular storage area in which the fixed error instruction word is detected; and
    a third step of accessing the correct instruction word in said auxiliary storage area when the particular pattern is read from said regular storage area in a storage read mode, an address for access to said auxiliary storage area having a bit portion of a fixed value common to all addresses;
    wherein said first step comprises determining the type of fixed error of said instruction word, and formulating said particular pattern in accordance with said type of fixed error.

2. An error processing method according to claim 1, wherein said second step comprises storing a correct instruction word in said auxiliary storage area at a storage location identified at least in part by said particular pattern set in the storage location of said regular storage area where the fixed error instruction word was detected.

3. An error processing method according to claim 1, wherein said second step comprises storing a correct instruction word in said auxiliary storage area at a storage location identified at least in part by at least part of the address of the storage location of said regular storage area where the fixed error instruction word was detected.

4. An error processing method for producing a correct instruction word in an information processing system having a regular instruction storage area and an alternative instruction storage area for storing instruction words at respective addressable storage locations, comprising the steps of:
    (a) writing an instruction word into a selected storage location of said regular instruction storage area;
    (b) reading out said instruction word from said selected storage location of said regular instruction storage area and checking said instruction word for a fixed error;
    (c) when said read-out instruction word is found to have a fixed error;
        (c1) replacing the erroneous instruction word in said selector storage location with a particular pattern, and
        (c2) storing a correct version of the erroneous instruction words in said alternative instruction storage area at a storage location therein identifiable from said selected storage location of said regular instruction storage area;
    (d) when said read-out instruction word is found to be free of error, applying said read-out instruction word to an instruction processor; and
    (e) detecting when data read out of said selected storage location of said regular instruction storage area is said particular pattern and accessing said alternative instruction storage area to read out said correct version of an erroneous instruction word in response to such detection by reading a storage location in said alternative instruction storage area having an address identified at least on part from the address or content of said selected storage location of said regular instruction storage area;
    wherein said step (c1) includes determining the type of error of said erroneous instruction word, and formulating said particular pattern in accordance with said type of error.

5. An error processing method according to claim 4, wherein, in said step (e), said alternative instruction storage area is accessed by generating an address of a storage location therein on the basis of at least a part of the particular pattern read out of said selected storage location of said regular instruction storage area.

6. An error processing method according to claim 4, wherein, in said step (e), said alternative instruction storage area is accessed by generating an address of a storage location therein on the basis of at least a part of the address of the selected storage location from which said particular pattern was read out.

7. An error processing method according to claim 4, wherein said step (b) comprises:
    (b1) reading out said instruction word from said selected storage location of said regular instruction storage area;
    (b2) checking said read-out instruction word for error;
    (b3) when the read-out instruction word is found to be erroneous, writing a correct instruction word into said selected storage location and repeating steps (b1) and (b2);
    (b4) repeating step (b3) a predetermined number of times when said read-out instruction word continues to appear erroneous; and
    (b5) determining that said erroneous instruction word has a fixed error when said step (b3) has been repeated said predetermined number of times.

8. An error processing method according to claim 7, wherein said step (b5) further comprises correlating said correct instruction word with said erroneous instruction word and determining that said erroneous instruction word has a fixed error on the basis of said correlation.

9. An error processing method according to claim 8, wherein, when the result of said correlation shows a one-bit error or an error of the same value, the error is detected as a fixed error.

10. An error processing apparatus for producing a corrected instruction word in an information processing system, comprising:
    an instruction storage including a regular instruction storage area and an alternative instruction storage area for storing instruction words at respective addressable storage locations;

read means for producing an address of a selected storage location of said regular instruction storage area of said instruction storage to read out an instruction word therefrom;

error detector means connected to receive a read-out instruction word from said instruction storage for detecting whether said read-out instruction word has a fixed error;

error processor means responsive to said error detector means detecting an erroneous instruction word for replacing said erroneous instruction word in said selected storage location of said regular instruction storage area with a particular pattern and for storing a corresponding correct instruction word into said alternative instruction storage area at a storage location therein which has an address identifiable from said selected storage location of said regular instruction storage area; and decoder means connected to receive data read out of said instruction storage for detecting said particular pattern and for controlling said read means in response to said detecting to produce an address of said storage location in said alternative instruction storage area at which said corresponding correct instruction word is stored to read out said corresponding correct instruction word;

wherein said error processor means includes means responsive to said error detector means for determining the type of error of an erroneous instruction word and means for formulating said particular pattern in accordance with said type of error.

11. An error processing apparatus according to claim 10, wherein said read means includes an address register for holding a read address to access said instruction storage and selector means connected to said address register for normally providing said read address to said instruction storage and responsive to said decoder means detecting said particular pattern for providing to said instruction storage an address consisting of a part of said read address in said address register and a bit portion of fixed value which is common to addresses in said alternative instruction storage area.

12. An error processing apparatus according to claim 10, wherein said read means includes an address register for holding a read address to access said instruction storage and selector means connected to said address register for normally providing said read address to said instruction storage and responsive to said decoder means detecting said particular pattern for providing to said instruction storage an address consisting of a part of said particular pattern and a bit portion of fixed value which is common to addresses in said alternative instruction storage area.

13. An error processing apparatus according to claim 10, wherein said error processor means includes means responsive to said error detector means detecting an erroneous instruction word for correlating said erroneous instruction word with the corresponding correct instruction word and for determining when said erroneous instruction word has a fixed error on the basis of said correlation, said error processor means operating to replace a detected erroneous instruction word in said instruction storage with a particular pattern in response to determination of said fixed error.

14. An error processing apparatus according to claim 10, wherein said error processor means includes first means responsive to said error detector means and said read means for writing a correct instruction word into said selected storage location of said regular instruction storage area when the instruction word read out of said selected storage location continues to be erroneous, and second means responsive to said read-out instruction word continuing to be erroneous after operation of said first means a predetermined number of times for replacing said erroneous instruction word in said selected storage location with said particular pattern.

15. An error processing apparatus for producing a corrected instruction word in an information processing system, comprising:

an instruction storage including a regular instruction storage area and an alternative instruction storage area for storing instruction words at respective addressable storage locations;

read means for producing an address of a selected storage location of said regular instruction storage area of said instruction storage to read out an instruction word therefrom;

error detector means connected to receive a read-out instruction word from said instruction storage for detecting whether said read-out instruction word has a fixed error;

error processor means responsive to said error detector means detecting an erroneous instruction word for replacing said erroneous instruction word in said selected storage location of said regular instruction storage area with a particular pattern and for storing a corresponding correct instruction word into said alternative instruction storage area at a storage location therein which has an address identifiable from said selected storage location of said regular instruction storage area; and decoder means connected to receive data read out of said instruction storage for detecting said particular pattern and for controlling said read means in response to said detecting to produce an address of said storage location in said alternative instruction storage area at which said corresponding correct instruction word is stored to read out said corresponding correct instruction word, wherein said error processor means includes means for formulating the particular pattern so that all of the bits thereof have the same value as the error detected by said error detector means.

* * * * *